US012576909B2

(12) United States Patent (10) Patent No.: US 12,576,909 B2
Tsuda (45) Date of Patent: Mar. 17, 2026

(54) DRIVING ASSISTANCE DEVICE

(71) Applicant: TOYOTA JIDOSHA KABUSHIKI KAISHA, Toyota (JP)

(72) Inventor: Yukikazu Tsuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 18/504,470

(22) Filed: Nov. 8, 2023

(65) Prior Publication Data

US 2024/0262418 A1 Aug. 8, 2024

(30) Foreign Application Priority Data

Feb. 7, 2023 (JP) ................................. 2023-016864

(51) Int. Cl.
B62D 6/04 (2006.01)
B62D 15/02 (2006.01)

(52) U.S. Cl.
CPC ............... B62D 6/04 (2013.01); B62D 15/02 (2013.01)

(58) Field of Classification Search
CPC ........ B62D 6/04; B62D 15/02; B62D 15/025; B62D 15/0255; B62D 15/0265; B62D 1/06; B62D 1/046
USPC .......................................................... 701/41
See application file for complete search history.

(56) References Cited

U.S. PATENT DOCUMENTS

| | | | |
|---|---|---|---|
| 9,964,950 | B2 | 5/2018 | Takano |
| 10,017,116 | B2 | 7/2018 | Sato |
| 10,310,508 | B2 | 6/2019 | Kunisa et al. |
| 10,452,930 | B2 | 10/2019 | Sato |
| 10,663,973 | B2 | 5/2020 | Hashimoto et al. |
| 10,895,875 | B2 | 1/2021 | Hashimoto et al. |
| 11,001,198 | B2 | 5/2021 | Morimura et al. |
| 11,275,382 | B2 | 3/2022 | Hashimoto et al. |
| 2012/0271500 | A1 | 10/2012 | Tsimhoni et al. |
| 2019/0210630 | A1* | 7/2019 | Seok ........................ G06F 3/044 |
| 2020/0239072 | A1* | 7/2020 | Hirosawa ........... B62D 15/0255 |
| 2020/0269863 | A1 | 8/2020 | Yanagi et al. |
| 2021/0229598 | A1 | 7/2021 | Morimura et al. |
| 2021/0269025 | A1* | 9/2021 | Zarringhalam ........ B60K 35/65 |
| 2021/0380124 | A1 | 12/2021 | Urano et al. |

FOREIGN PATENT DOCUMENTS

| | | |
|---|---|---|
| JP | 2020-033013 A | 3/2020 |
| JP | 2020-117165 A | 8/2020 |
| JP | 2020-138600 A | 9/2020 |
| JP | 2021-175631 A | 11/2021 |

* cited by examiner

*Primary Examiner* — Scott A Reinbold
(74) *Attorney, Agent, or Firm* — SoraIP, Inc.

(57) ABSTRACT

The driving assistance device controls lateral movement of the vehicle. The driving assistance device includes a steering operation actuator that steers the wheels, a detection device that detects the position of the driver's hand touching the steering wheel, and an electronic control unit that controls the lateral direction of the vehicle. In lateral control, the electronic control unit controls the steering operation actuator so that the vehicle laterally moves to the right when a hand touches the right portion of the steering wheel, and when the hand touches the left portion of the steering wheel. In this case, the steering operation actuator is controlled so that the vehicle laterally moves to the left.

6 Claims, 9 Drawing Sheets

FIG. 2A
SCENE A
FIG. 2B
SCENE B1
FIG. 2C
SCENE B2
FIG. 2D
SCENE B3
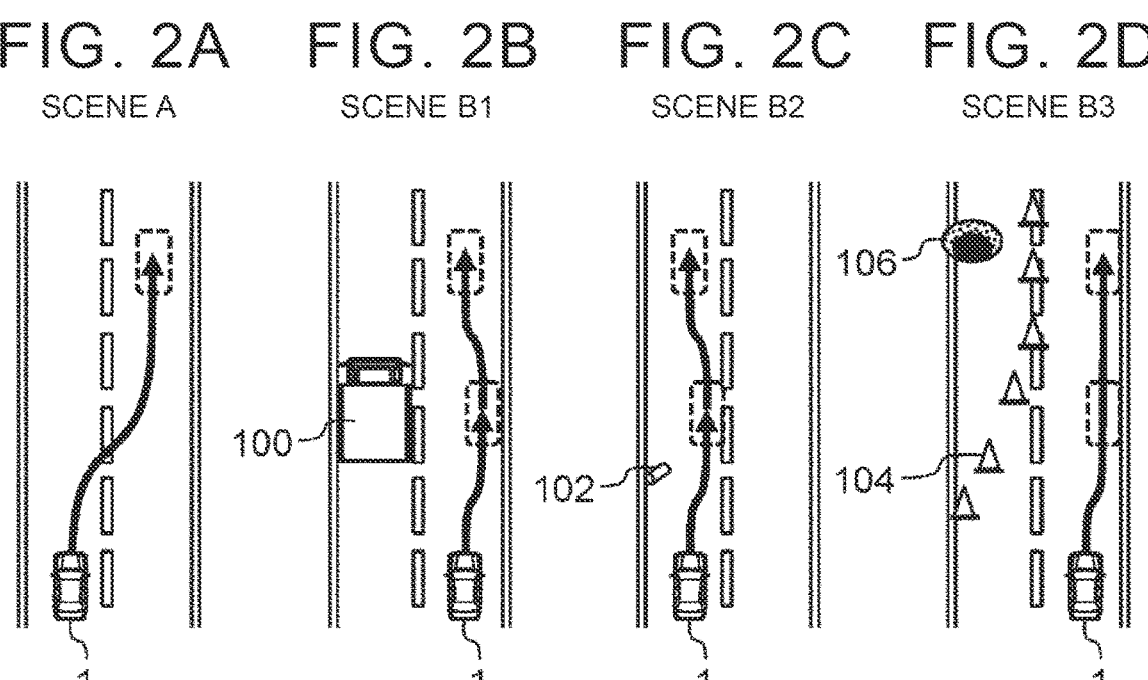
FIG. 2E
SCENE C
FIG. 2F
SCENE D
FIG. 2G
SCENE E
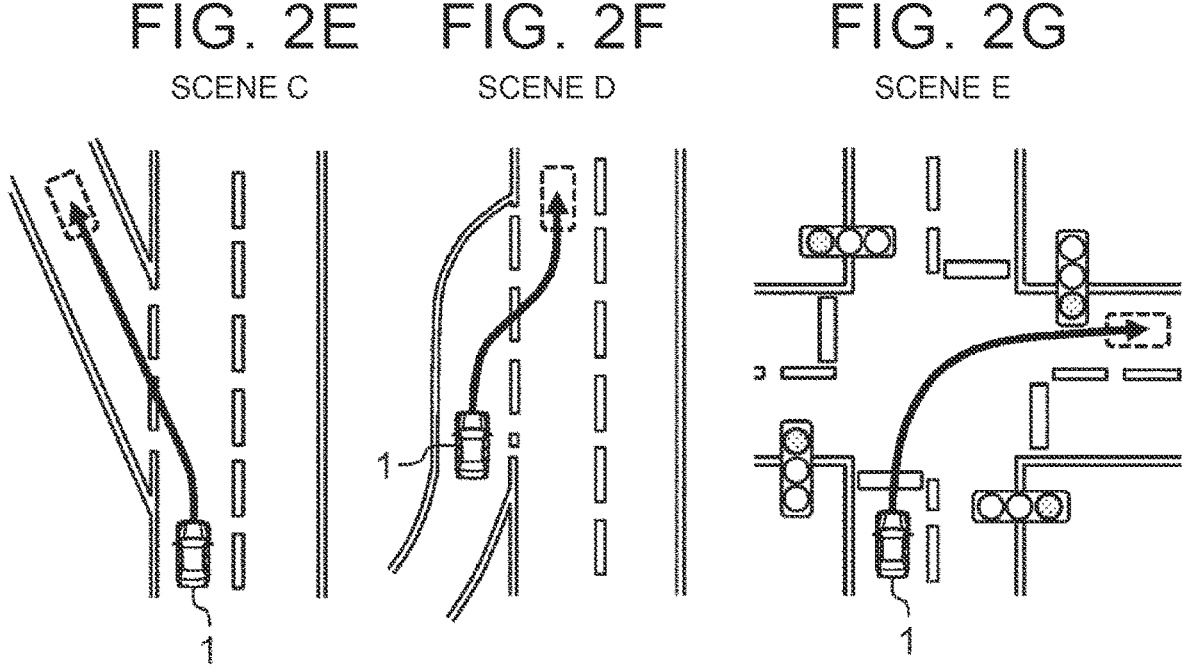

DRIVING ASSISTANCE DEVICE

CROSS-REFERENCE TO RELATED APPLICATION

This application claims priority to Japanese Patent Application No. 2023-016864 filed on Feb. 7, 2023, incorporated herein by reference in its entirety.

BACKGROUND

1. Technical Field

The present disclosure relates to a vehicle driving assistance device.

2. Description of Related Art

Japanese Unexamined Patent Application Publication No. 2020-033013 (JP 2020-033013 A) discloses a driving assistance device. The driving assistance device detects that the driver has permitted lane change based on a driver's operation input to a predetermined operation member of the vehicle. A steering wheel together with a turn signal lever and an operation device is given as an example of the predetermined operation member for detecting the driver's intention to change lanes. The operation on the steering wheel is detected based on a signal of a steering torque sensor.

SUMMARY

In JP 2020-033013 A, when the predetermined operation member is the steering wheel, the driver needs to steer the steering wheel to indicate the intention to change lanes. Even though the vehicle includes the driving assistance device, an operation similar to the driving operation by the driver is required for lateral movement of the vehicle.

The present disclosure has been made in view of the problem described above, and has an object to provide a driving assistance device in which a driver can simply request the start of lateral movement by using a steering wheel while eliminating the need for the driver to turn the steering wheel.

A driving assistance device according to a first aspect of the present disclosure is configured to control lateral movement of a vehicle. The driving assistance device includes:
  a steering operation actuator configured to turn wheels;
  a detection device configured to detect a position of a driver's hand touching a steering wheel; and
  an electronic control unit configured to execute lateral control on the vehicle.
The electronic control unit is configured to, in the lateral control:
  control the steering operation actuator to cause the vehicle to laterally move to right when the hand touches a right portion of the steering wheel; and
  control the steering operation actuator to cause the vehicle to laterally move to left when the hand touches a left portion of the steering wheel.
The right portion and the left portion may be portions located on a right side and a left side of the vehicle with respect to a vertical plane passing through a center of the steering wheel.
The right portion may be located on a right side with respect to a center line of the steering wheel that is parallel to a vertical direction when the steering wheel is viewed alone from a front, and may include an upper right portion, a middle right portion, and a lower right portion along a rotation direction of the steering wheel.
The left portion may be located on a left side with respect to the center line when the steering wheel is viewed alone from the front, and may include an upper left portion, a middle left portion, and a lower left portion along a direction opposite to the rotation direction. The middle right portion and the middle left portion may be dead zones in which the lateral control is not executed by the electronic control unit when the hand touches the middle right portion and the middle left portion.
The detection device may be a touch sensor built into the steering wheel.
A driving assistance device according to a second aspect of the present disclosure is configured to control lateral movement of a vehicle. The driving assistance device includes:
  a steering operation actuator configured to turn wheels;
  a detection device configured to detect a clockwise or counterclockwise stroking motion of
  a driver's hand on a steering wheel; and
  an electronic control unit configured to execute lateral control on the vehicle.
The electronic control unit is configured to, in the lateral control:
  control the steering operation actuator to cause the vehicle to laterally move to right when the clockwise stroking motion is detected; and
  control the steering operation actuator to cause the vehicle to laterally move to left when the counterclockwise stroking motion is detected.
According to the present disclosure, the driver can simply request the start of lateral movement by using the steering wheel while eliminating the need for the driver to turn the steering wheel.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2A is a diagram for explaining a specific example of lateral movement of the vehicle;

FIG. 2B is a diagram for explaining a specific example of lateral movement of the vehicle;

FIG. 2C is a diagram for explaining a specific example of lateral movement of the vehicle;

FIG. 2D is a diagram for explaining a specific example of lateral movement of the vehicle;

FIG. 2E is a diagram for explaining a specific example of lateral movement of the vehicle;

FIG. 2F is a diagram for explaining a specific example of lateral movement of the vehicle;

FIG. 2G is a diagram for explaining a specific example of the lateral movement of the vehicle;

DETAILED DESCRIPTION OF EMBODIMENTS

Figure 1:
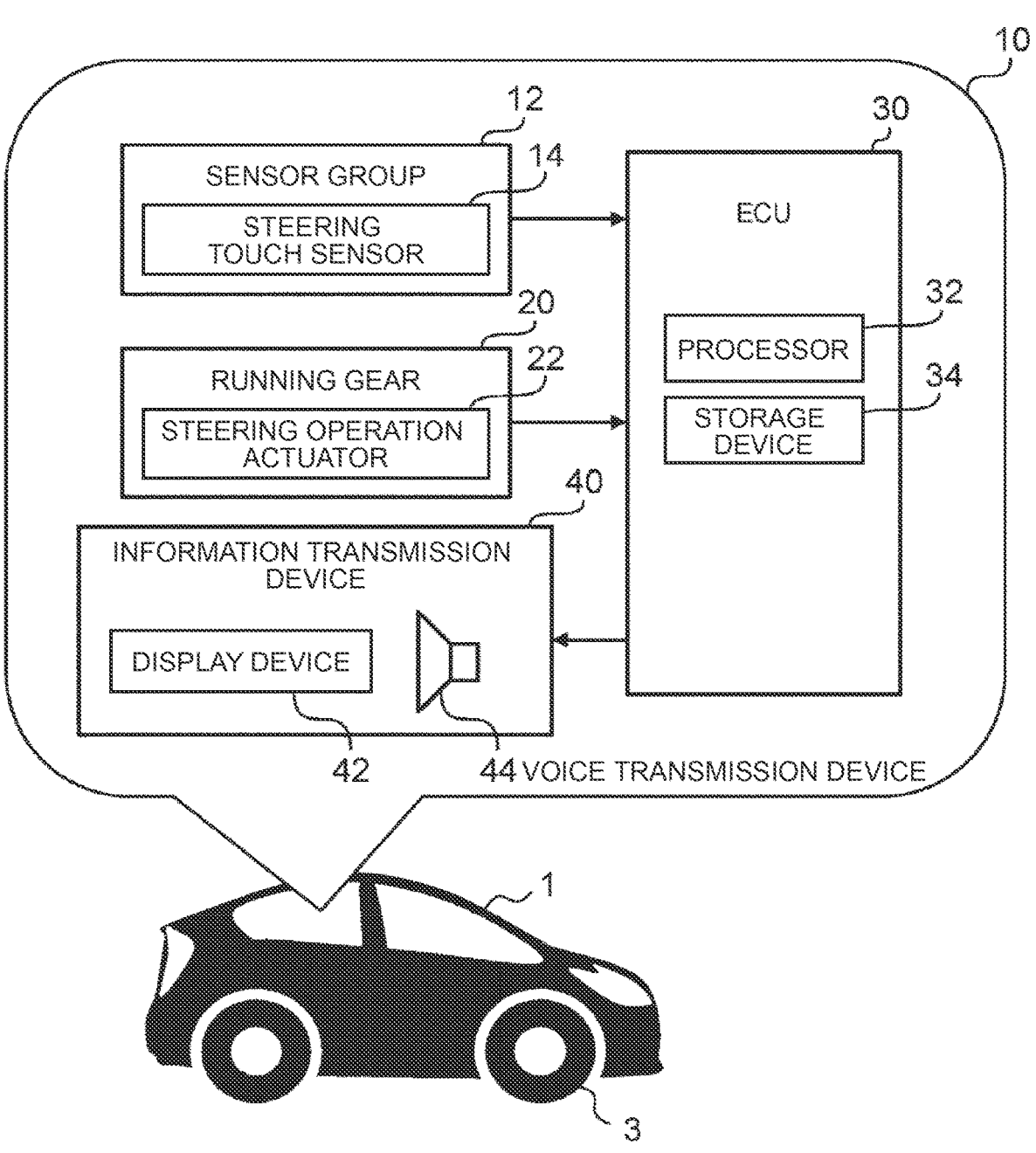
FIG. 1 is a diagram schematically showing an example of configuration of a vehicle control system to which a driving assistance device according to an embodiment is applied.

Embodiments of the present disclosure will be described with accompanying drawings. Elements common to each drawing are assigned the same reference numerals, and overlapping descriptions are omitted or simplified.

1. Vehicle Control System Configuration

FIG. 1 is a diagram schematically showing an example of the configuration of a vehicle control system 10 to which a driving assistance device according to an embodiment is applied. A "driving assistance device" according to the present disclosure is included in the vehicle control system 10 as an example. The vehicle control system 10 is mounted on the vehicle 1 and executes various controls of the vehicle 1. A vehicle control system 10 includes a sensor group 12, a travel device 20, an electronic control unit (ECU) 30 and an information transmission device 40.

The sensor group 12 includes recognition sensors, vehicle state sensors, and position sensors. The recognition sensor recognizes (detects) the situation around the vehicle 1. Examples of recognition sensors include cameras, Laser Imaging Detection and Ranging (LIDAR), radar, and the like. A vehicle state sensor detects the state of the vehicle 1. Vehicle state sensors include, for example, vehicle speed sensors, acceleration sensors, yaw rate sensors, and steering angle sensors. The position sensor detects the position and orientation of the vehicle 1. For example, location sensors include Global Navigation Satellite System (GNSS) receivers.

Sensor group 12 also includes steering touch sensor (or simply touch sensor) 14. The touch sensor 14 is built in a steering wheel (SW) 2 (see FIG. 3, for example) of the vehicle 1. The touch sensor 14 is, for example, a capacitive type, and detects that the driver's hand has touched the SW2. Therefore, the touch sensor 14 can be used, for example, to detect that the driver is holding SW2.

More specifically, the touch sensor 14 is installed so as to detect the position of the driver's hand touching the steering wheel 2. Furthermore, the touch sensor 14 is installed so as to be able to detect the action of the driver's hand stroking the SW2 clockwise or counterclockwise, as will be described later together with the seventh control example. Note that the steering touch sensor 14 corresponds to an example of the "detection device" according to the present disclosure. As another example of the detection device, for example, a driver monitor that can detect various states and actions of the driver using a camera may be used.

The travel device 20 is a device for operating the vehicle 1. For example, the travel device 20 includes a driving device, a braking device, and a steering device. The driving device includes, for example, at least one of an electric motor and an internal combustion engine for driving (accelerating) the vehicle 1. The braking device includes a brake actuator for braking (decelerating) the vehicle 1. The steering device includes a steering operation actuator 22 that steers the wheels 3. The steering operation actuator 22 includes an electric motor. The steering operation actuator 22 can be used as an actuator that assists steering by the driver or controls the steering angle of the wheels 3 during automatic steering that does not require steering operation by the driver.

In addition, SW2 is mechanically connected with the wheel 3 (steered wheel) as an example. Therefore, when the wheels 3 are steered by the steering operation actuator 22, the SW2 rotates accordingly. However, SW2 does not necessarily have to be mechanically connected to the wheels 3 (steered wheels) except for a third control example described later, that is, it may be applied to a steer-by-wire steering system. Also, SW2 does not necessarily have to be circular.

The ECU 30 is a computer that controls the vehicle 1. ECU 30 includes a processor 32 and a storage device 34. The processor 32 executes various processes. The storage device 34 stores various information necessary for processing by the processor 32. Note that the ECU 30 may be configured by combining a plurality of ECUs. Various processes by the ECU 30 are realized by the processor 32 executing the computer program. A computer program is stored in the storage device 34. Alternatively, the computer program may be recorded on a computer-readable recording medium.

The information transmission device 40 is a device for transmitting information of the vehicle 1 (own vehicle information), surrounding situation information, operation information of the driver, and control state of the vehicle 1 to the driver. Information transmission device 40 is at least one of display device 42 and audio transmission device 44. The display device 42 is, for example, at least one of a Head Up Display (HUD), a Multi Information Display (MID), and a meter panel. The audio transmission device 44 is a speaker.

2. Driving Support Control (Lateral Control)

In this embodiment, the vehicle control system 10 functions as an advanced driving assistant system (ADAS), controls the travel device 20, and operates a predetermined driving assistance function. The predetermined driving assistance function includes, for example, one or both of a lane change assistance function and a lane keeping assistance function as a driving assistance function related to lateral movement of the vehicle 1 (operation in the lateral direction). Also, the vehicle 1 may be an automated driving vehicle capable of executing level 3 autonomous driving defined by the Society of Automotive Engineers (SAE) of the United States.

FIGS. 2A to 2G are diagrams for explaining a specific example of the lateral movement of the vehicle 1. Examples of the lateral movement of the vehicle 1 include the following actions performed in various scenes. That is, the action of lateral movement in scene A is a lane change. The lateral movement motion in each of the scenes B1 to B3 relates to lateral movement within the same lane for avoiding various avoidance targets. Various objects to be avoided are, for example, a peripheral vehicle 100 that is running or stopped, a fallen object 102, an object installed on the road 104, or a road defect 106 such as a depression. Also, the lateral movement in scene C is performed at a fork in the road. The lateral movement action in scene D is performed at the confluence. Further, as in scene E, the lateral movement action includes turning the vehicle 1 left or right.

When the driver uses the driving assistance function for lateral movement in various scenes as described above, the driver needs to request the vehicle 1 to start the lateral movement he/she desires. It is useful for the driver to be able to simply request the start of lateral movement without having to turn the steering wheel 2. In addition, if the lateral movement request method is complicated, it becomes difficult for the vehicle 1 to perform the intended lateral movement operation at the timing and place intended by the driver.

In view of the above-described problem, in the present embodiment, the ECU 30 executes "lateral direction control" as driving assistance control for realizing a driving assistance function related to lateral movement. This lateral control utilizes the steering touch sensor 14 to detect lateral movement requests from the driver. That is, the ECU 30 controls the steering operation actuator 22 in response to a lateral movement request from the driver detected based on the signal from the touch sensor 14.

Specifically, the following first to sixth control examples regarding lateral direction control have the following points in common. That is, the ECU 30 controls the steering operation actuator 22 so that the vehicle 1 laterally moves to the right when the driver's hand touches the right portion (or right portion) RP of the SW2. On the other hand, the ECU 30 controls the steering operation actuator 22 so that the vehicle 1 laterally moves to the left when the hand touches the left portion (or the left portion) LP of the SW2. More specifically, the "right side" here means the right side when viewed in the direction of travel of the vehicle, and the "left side" refers to the left side when viewed in the direction of travel of the vehicle. Details of the seventh control example will be described later.

Also, the first to seventh control examples will be described assuming a scene in which the driving support function with the hands-off function is being executed. However, the lateral control according to the first to seventh control examples may be executed when the driver's motion for requesting lateral movement is detected while the driver is gripping SW2.

2-1. First Control Example

Figure 3:
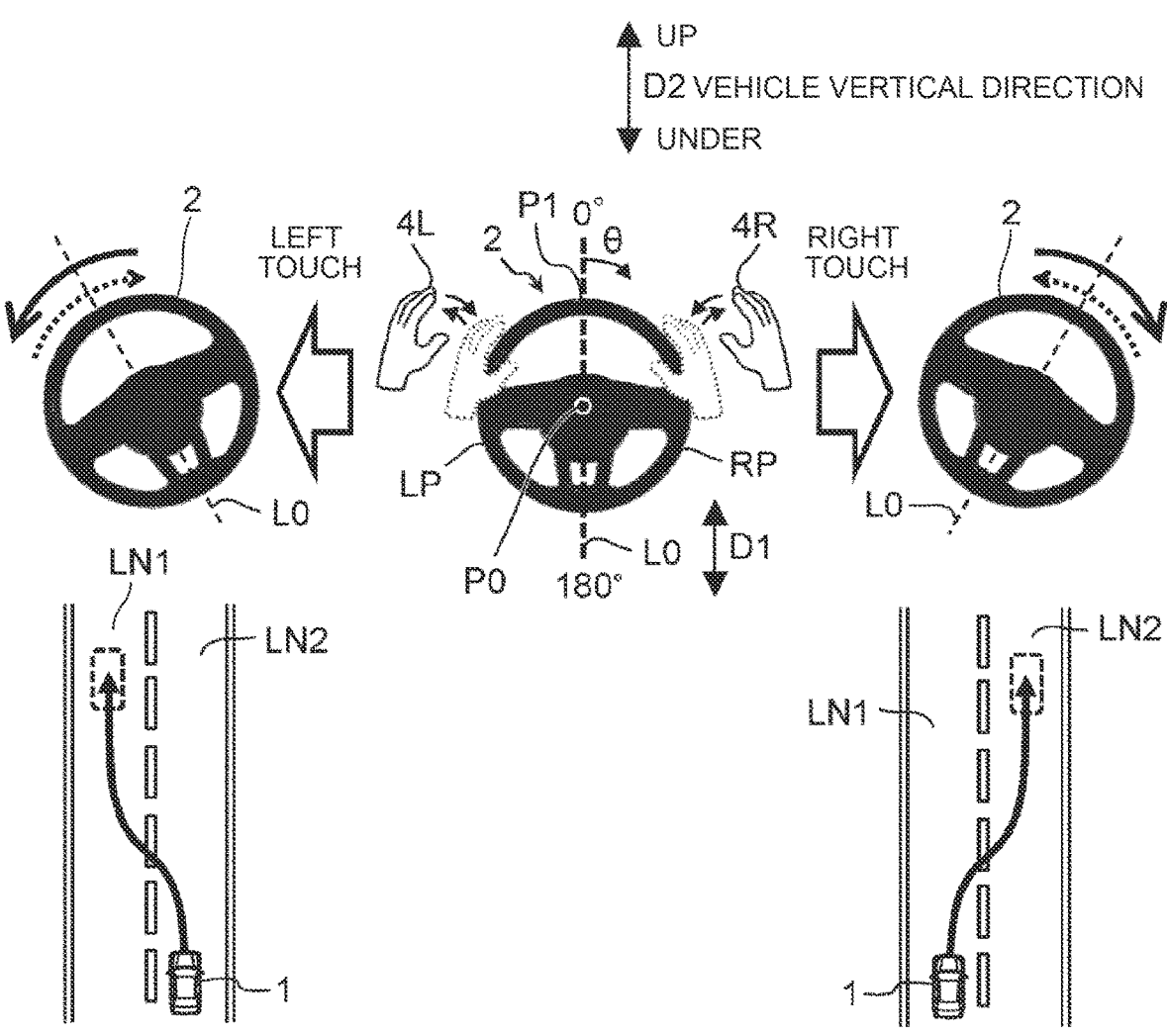
FIG. 3 is a diagram for explaining a first control example of lateral direction control according to the embodiment.

FIG. 3 is a diagram for explaining a first control example of lateral direction control according to the embodiment. A straight line L0 shown in FIG. 3 corresponds to the center line of SW2. The center line L0 is parallel to the vertical direction D1 of the SW2 when the SW2 is viewed alone from the front as shown in FIG. 3. SW2 in the neutral state is represented in the center of FIG. 3. In the neutral state, the center line L0 is parallel to the vehicle vertical direction D2.

In the first control example, the right portion RP of SW2 corresponds to a portion located on the right side with respect to the center line L0. The left portion LP corresponds to a part located on the left side with respect to the center line L0. More specifically, the angle θ used to describe the position of the portion of SW2 is the angle about the center point P0 of SW2. The angle θ is 0° at the upper end position P1 of SW2. The right portion RP corresponds to a portion where the angle θ is within the angle range of 0° to 180°. The left portion LP corresponds to a part where the angle θ is within the angle range from 180° to 360°.

In the first control example, the ECU 30 determines, based on the signal from the touch sensor 14, whether the position touched by the driver's hand is the right portion RP or the left portion LP. The ECU 30 then controls the steering operation actuator 22 so that the vehicle 1 changes lanes to the right when the position touched by the driver's hand (for example, the right hand 4R) is the right portion RP. More specifically, the ECU 30 causes the lane change from the current lane LN1 to the lane LN2 adjacent to the right side of the current lane LN1. As a result, SW2 rotates to the right as the wheels 3 are steered, as shown in FIG. 3. SW2 then returns to the neutral position.

On the other hand, the ECU 30 controls the steering operation actuator 22 so that the vehicle 1 changes lanes to the left when the position touched by the hand (for example, the left hand 4L) is the left portion LP. More specifically, the ECU 30 causes the lane change from the current lane LN2 to the lane LN1. As a result, as shown in FIG. 3, SW2 rotates to the left as the wheels 3 are steered. SW2 then returns to the neutral position.

According to the first control example described above, when the driver taps SW2 lightly as shown in FIG. 3, the lane change from the right side to the left side is performed automatically, depending on the position SW2 was touched. Thus, according to the first control example, the driver taps the right portion RP or the left portion LP of SW2 corresponding to the desired direction of the lane direction in order to convey the intention of the driver to change lanes. An easy and simplified operation is used. As a result, the driver can inform the vehicle 1 of his intention to change lanes in an intuitive and simple manner. This leads to being able to quickly and accurately assist the lane change based on the driver's intention.

As described above, according to the first control example, the driver can use SW2 to simply request the start of the lateral movement operation, while eliminating the need for the driver to rotate SW2. This also applies to the second to seventh control examples.

In addition, according to the first control example, the action performed by the driver to request lateral movement is an action (contact) of touching SW2, such as tapping or stroking SW2, unlike steering by the driver. Therefore, according to this method, it becomes easy to separate the driver's action for requesting lateral movement from the driver's action (hands-on action) of gripping SW2 for manual operation. This also applies to the second to seventh control examples.

Further, according to the first control example, the existing touch sensor 14 in the vehicle 1 for determining whether or not SW2 is gripped by the driver is used to determine whether or not the driver is performing a lateral movement request. As a result, the lateral direction control according to the present embodiment can be performed without requiring an additional device. This also applies to the second to seventh control examples.

2-2. Second Control Example

Figure 4:
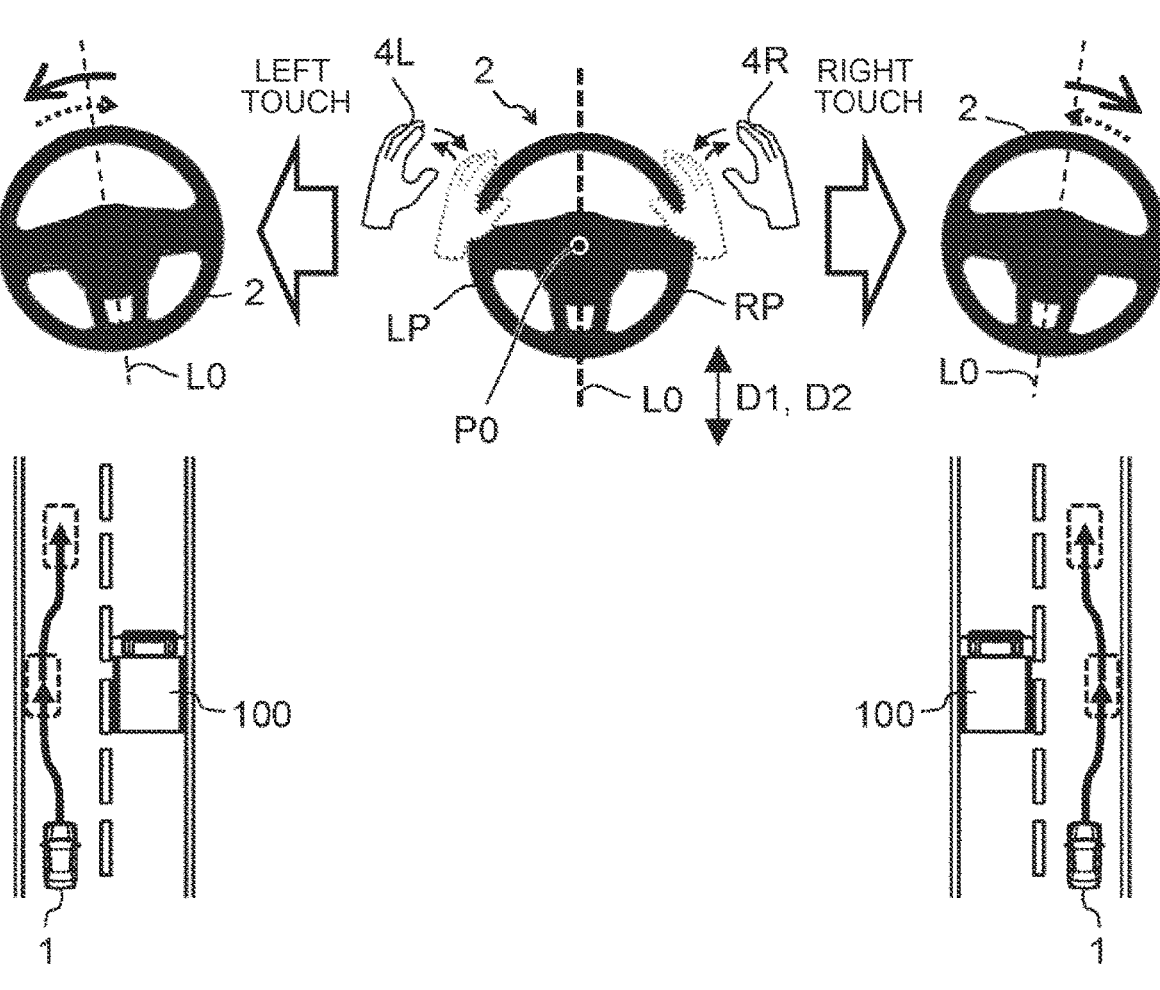
FIG. 4 is a diagram for explaining a second example of lateral direction control according to the embodiment.

FIG. 4 is a diagram for explaining a second example of lateral direction control according to the embodiment. The second control example differs from the first control example in the content of the lateral movement operation that is the target of the lateral direction control. That is, in the second control example, when the position touched by the right hand 4R is the right portion RP, the ECU 30 controls the steering operation actuator 22 so that the vehicle 1 moves to the right within the same lane. On the other hand, when the position touched by the left hand 4L is the right portion LP, the ECU 30 controls the steering operation actuator 22 so that the vehicle 1 moves leftward within the same lane.

Note that the lateral direction control may be executed for, for example, a lateral movement operation performed at a branch point or a merging point, or a right or left turn, instead of a lane change or a lateral movement operation within the same lane (FIG. 2E to FIG. 2G). As described above, according to the present embodiment, various lateral movement operations intended by the driver can be realized while simplifying the operation for the lateral movement request.

2-3. Third Control Example

Figure 5:
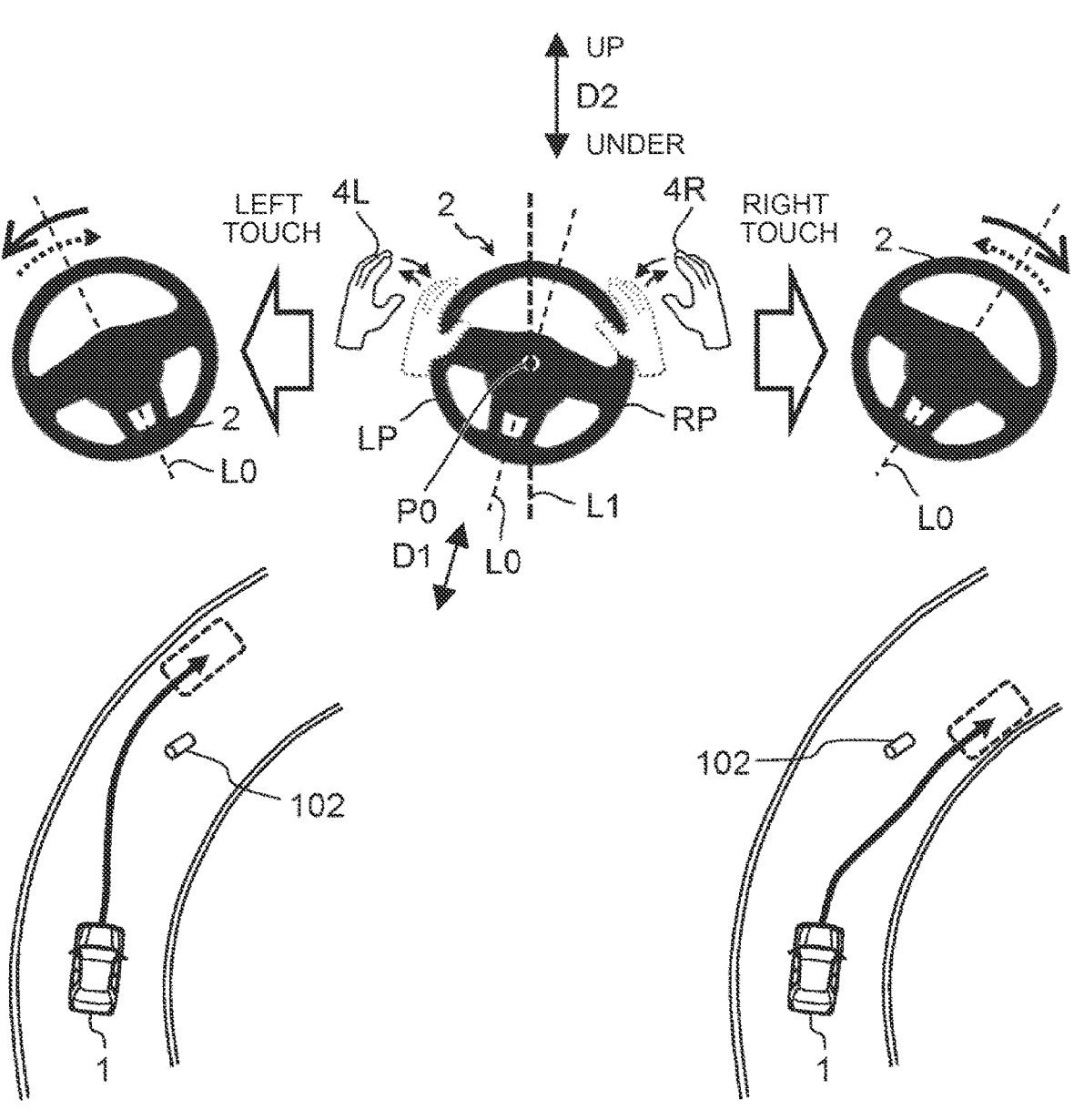
FIG. 5 is a diagram for explaining a third control example of lateral direction control according to the embodiment.

FIG. 5 is a diagram for explaining a third example of lateral direction control according to the embodiment. In the first and second control examples described above, the right portion RP and the left portion LP are distinguished by the center line L0 as a boundary. In other words, in the first and second control examples, assuming that SW2 is in the neutral state (that is, in the straight-ahead state), SW2 is divided into a right portion RP and a left portion LP. On the other hand, in the center of FIG. 5, SW2 is shown in a state in which SW2 is rotating, for example, clockwise due to automatic steering.

Even if the SW2 is mechanically connected to the wheels 3 (steered wheels) as in the example of the vehicle 1, the center line L0 of the SW2 coincides or substantially coincides with the direction of the center line L1, which is a straight line along the vertical plane passing through the center point P0 of the SW2, when traveling straight. On the other hand, when the SW2 is mechanically connected to the wheels 3, the direction of the center line L0 of the SW2 is different from the direction of the center line L1 during steering, as shown in FIG. 5.

Therefore, in the third control example, the right portion RP and the left portion LP are distinguished by the center line L1 instead of the center line L0. That is, the right portion RP is specified as a portion located on the right side of the center line L1. Similarly, the left portion LP is specified as a part located on the left side with respect to the center line L1.

According to the third control example described above, it is possible for the driver to request lateral movement without being conscious of the rotation angle of SW2 during steering.

Note that FIG. 5 shows a lateral movement operation within the same lane as an example of the lateral movement operation according to the third control example. However, the third control example may be used for other lateral movement actions such as lane changes.

2-4. Fourth Control Example

Figure 6:
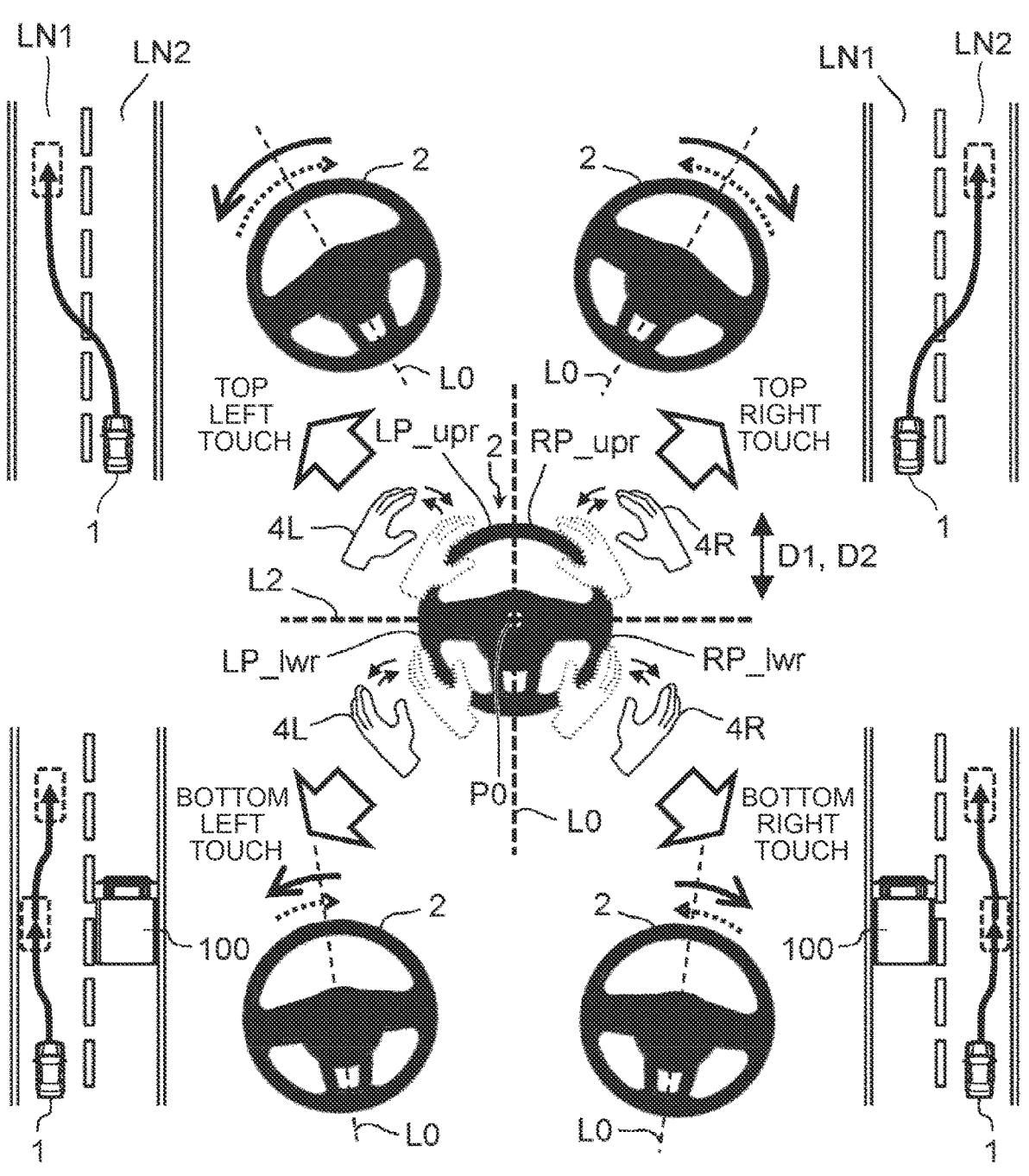
FIG. 6 is a diagram for explaining a fourth control example of lateral direction control according to the embodiment.

FIG. 6 is a diagram for explaining a fourth example of lateral direction control according to the embodiment. In the fourth control example, in the lateral direction control, the ECU 30 controls the steering operation actuator 22 so that the vehicle 1 moves laterally in different manners depending on the position touched by the driver's hand.

Specifically, in the fourth control example, as in the first and second control examples, the right portion RP and the left portion LP are distinguished by the center line L0 as a boundary. In addition, the right portion RP is divided into an upper right portion RP_upr and a lower right portion PP_lwr with the center line L2 as a boundary. Similarly, the left portion LP is divided into an upper left portion LP_upr and a lower left PP_lwr with the center line L2 as a boundary. The center line L2 is a straight line along the horizontal plane passing through the center point P0 of SW2. Therefore, in the fourth control example, the signal of the touch sensor 14 is determined more finely than in the first to third control examples.

When the position touched by the right hand 4R is the upper right portion RP_upr, the ECU 30 controls the steering operation actuator 22 so that the vehicle 1 changes lanes to the right. Further, when the position touched by the right hand 4R is the lower right portion RP_lwr, the ECU 30 controls the steering operation actuator 22 so that the vehicle 1 moves rightward within the same lane.

Similarly, the ECU 30 controls the steering operation actuator 22 so that the vehicle 1 changes lanes to the left when the position touched by the left hand 4L is the upper left portion LP_upr. Further, when the position touched by the left hand 4L is the left lower portion LP_lwr, the ECU 30 controls the steering operation actuator 22 so that the vehicle 1 moves leftward within the same lane.

According to the fourth control example described above, the driver intuitively requests one of a plurality of types (for example, two types) of lateral movement using a single member, that is, SW2. And it becomes possible to transmit to the vehicle 1 by a simple method. Then, the ECU 30 can satisfactorily separate a plurality of types of lateral movement requests.

Note that FIG. 6 shows a combination of lane change and lateral movement within the same lane as an example of a plurality of types of lateral movement according to the fourth control example. However, the fourth control example may be used for other combinations of types of lateral movement, such as those shown in FIGS. 2A to 2G. This also applies to the fifth control example below. Also in the fourth control example and the fifth and sixth control examples, the center line L1 may be used instead of the center line L0.

2-5. Fifth Control Example

Figure 7:
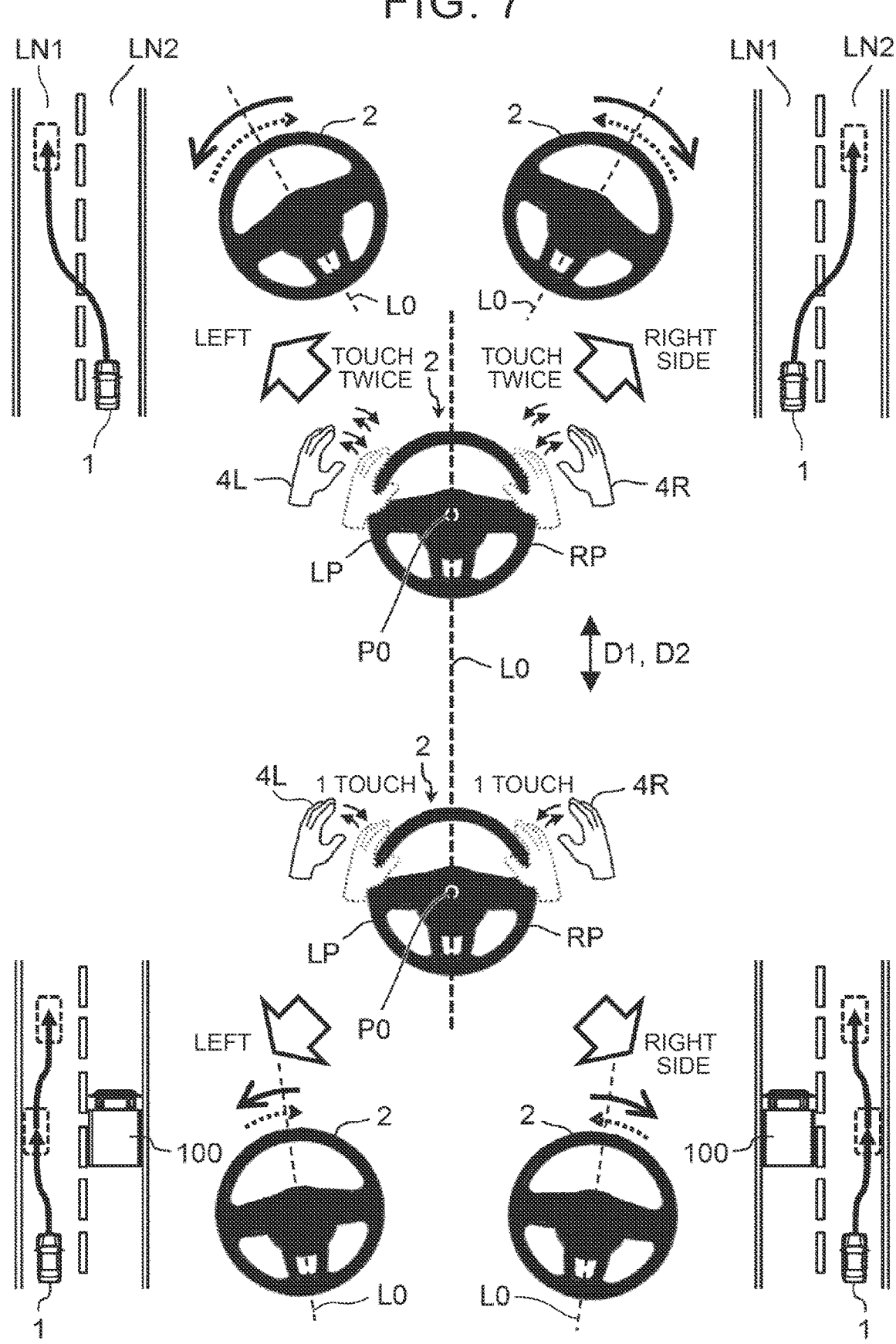
FIG. 7 is a diagram for explaining a fifth control example of lateral direction control according to the embodiment.

FIG. 7 is a diagram for explaining a fifth control example of lateral direction control according to the embodiment. In the fifth control example, in the lateral direction control, the ECU 30 controls the steering operation actuator 22 so that the vehicle 1 moves laterally in different manners depending on the number of times the driver's hand touches the steering wheel.

Specifically, in the fifth control example, as in the first and second control examples, the right portion RP and the left portion LP are distinguished by the center line L0 as a boundary. After that, when the touch sensor 14 detects that the right hand 4R touches the right portion RP twice in succession by tapping the SW2, the ECU 30 causes the vehicle 1 to change lanes to the right. It controls the steering operation actuator 22. On the other hand, when the right hand 4R touches the right portion RP one time, the ECU 30 controls the steering operation actuator 22 so that the vehicle 1 moves to the right in the same lane.

Similarly, when the touch sensor 14 detects that the left hand 4L touches the left portion LP twice in succession, the ECU 30 controls the steering operation actuator so that the vehicle 1 changes lanes to the left. 22. On the other hand, the ECU 30 controls the steering operation actuator 22 so that the vehicle 1 moves to the left in the same lane when the number of times the left hand 4L touches the right portion LP is one.

Also according to the fifth control example described above, the driver inform the vehicle 1 of one request out of a plurality of types (for example, two types) of lateral movement using a single member, that is, SW2, in an intuitive and simple method. Then, the ECU 30 can satisfactorily separate a plurality of types of lateral movement requests.

Further, in the lateral direction control according to the modification of the fifth control example, the ECU 30 causes the vehicle 1 to move laterally in different modes according to the "time" during which the driver's hand touches the SW2. Alternatively, the steering operation actuator 22 may be controlled. Specifically, taking a scene in which the right hand 4R touches the right portion RP as an example, if the relevant time is longer than, for example, a predetermined threshold value, the lane may be changed to the right, for example. Then, when the time is equal to or less than the threshold, for example, an operation of laterally moving to the right within the same lane may be performed.

2-6. Sixth Control Example

Figure 8:
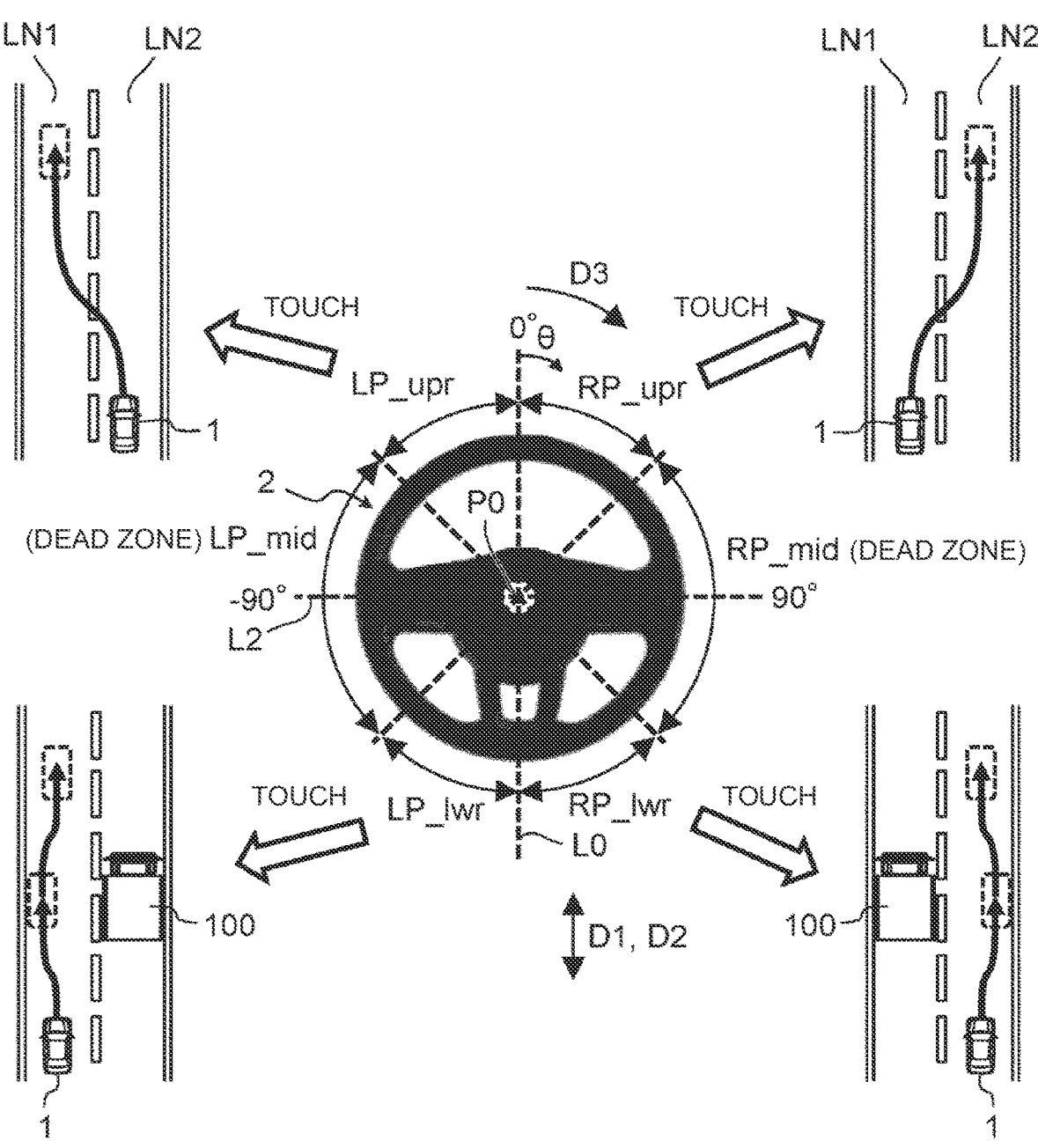
FIG. 8 is a diagram for explaining a sixth control example of lateral direction control according to the embodiment.

FIG. 8 is a diagram for explaining a sixth control example of lateral direction control according to the embodiment. The sixth control example is based on the above-described fourth control example, but differs from the fourth control example in that each of the right portion RP and the left portion LP includes the following dead zone.

Specifically, in the sixth control example, the right portion RP includes an upper right portion RP_upr, a right middle portion RP_mid, and a lower right portion RP_lwr along the rotation direction D3 (for example, clockwise direction) of SW2. Similarly, the left portion LP includes upper left portion LP_upr, left middle part LP_mid, and left lower part LP1_wr along the opposite direction of rotation direction D3.

The middle right portion RP_mid and the middle left portion LP_mid correspond to portions where the driver grips SW2 during manual driving. More specifically, for example, the middle right portion RP_mid includes a position where the angle θ (see FIG. 3) is 90°, and the middle left portion LP_mid includes a position where the angle θ is −90°.

In the sixth control example, each of these right middle RP_mid and left middle LP_mid is set as a dead zone. This dead band corresponds to a portion where the ECU 30 does not execute (permit) the lateral direction control even when the driver's hand 4R or 4L touches it. In addition, when the driver's hand 4R or 4L touches the dead zone (right middle RP_mid or left middle LP_mid), the ECU 30 indicates that the driver's operation of gripping SW2 (hands-on operation) for manual operation is may be determined to have been done.

According to the sixth control example described above, by providing the above-described dead zone, the driver's operation of gripping SW2 (hands-on operation) for manual driving and the driver's operation for requesting lateral movement are appropriately separated. This makes it possible to avoid unnecessary actuation of the lateral control when the driver attempts to initiate manual driving.

2-7. Seventh Control Example

Figure 9:
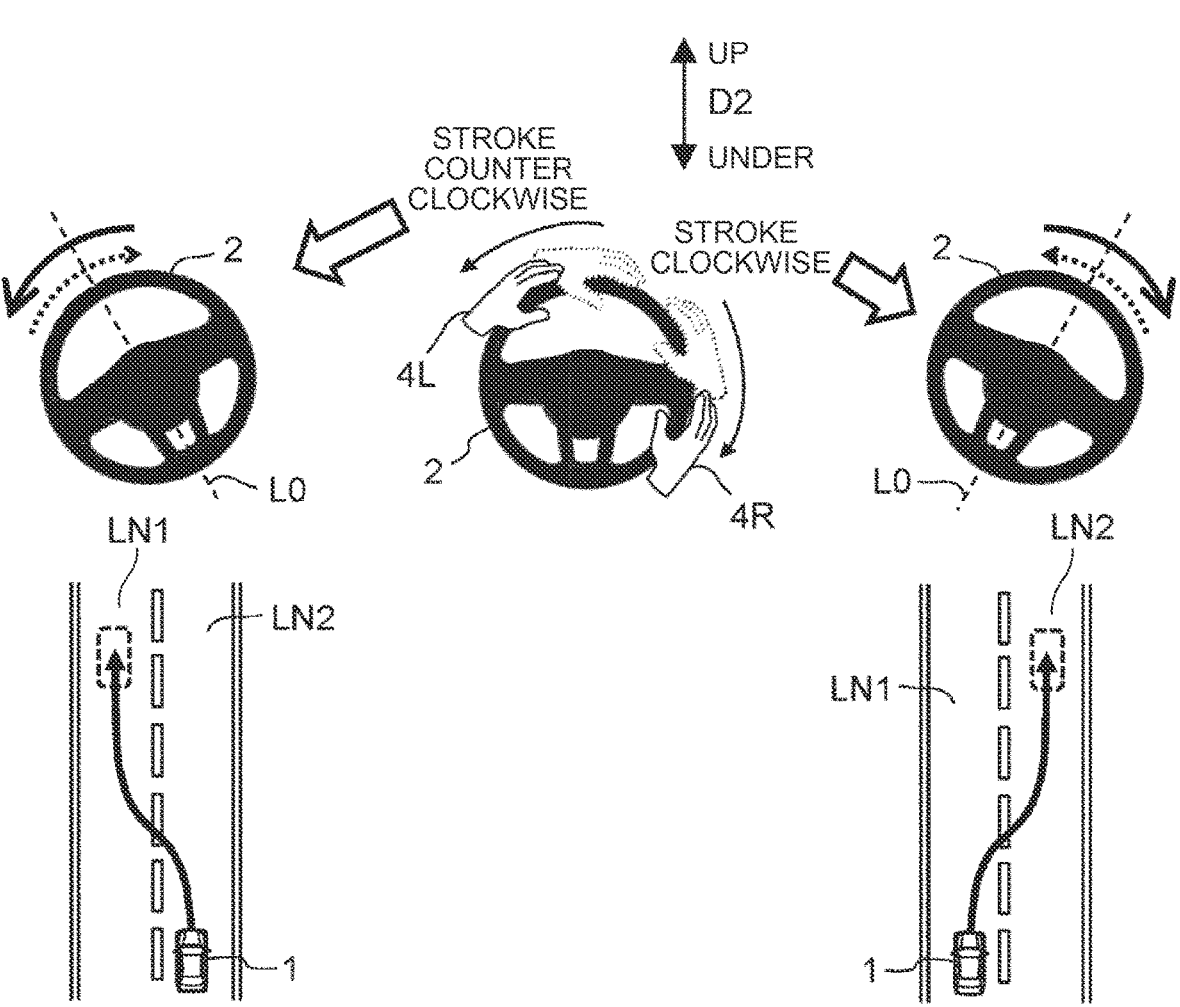
FIG. 9 is a diagram for explaining a seventh control example of lateral direction control according to the embodiment.

FIG. 9 is a diagram for explaining a seventh control example of lateral direction control according to the embodiment. In the first to sixth control examples described above, the touch sensor 14 is used to detect the position touched by the hand. On the other hand, in the seventh control example, the touch sensor 14 is used to detect the action of the driver's hand stroking the SW2 clockwise or counterclockwise. In addition, according to the "stroking motion" here, the steering torque is not applied from the driver to SW2.

In the seventh control example, when a clockwise stroking motion is detected, the ECU 30 controls the steering operation actuator 22 so that the vehicle 1 changes lanes to the right. On the other hand, when a counterclockwise stroking motion is detected, the ECU 30 controls the steering operation actuator 22 so that the vehicle 1 changes lanes to the left.

According to the seventh control example described above, the lane is automatically changed to the right or left depending on the direction in which the driver's hand strokes SW2. According to the seventh control example as well, the driver can inform the vehicle 1 of his intention to change lanes in an intuitive and simple manner. This leads to being able to quickly and accurately assist the lane change based on the driver's intention.

Note that FIG. 9 shows a lane change as an example of the lateral movement operation according to the seventh control example. The seventh control example may be used for other lateral movement such as lateral movement in the same lane.

2-8. Example of a Method For Separating Actions for Requesting Lateral Movement From Hands-On Actions The operation for requesting lateral movement (here, motion A) and the hands-on operation may be separated based on, for example, the time during which the driver's hand touches SW2 as follows. Here, the output of the touch sensor 14 when the hand does not touch SW2 is called OFF, and the output when the hand touches SW2 is called ON. When a series of operations in which the output of the touch sensor 14 changes from OFF to ON and then changes from ON to OFF within a predetermined time T0 (for example, 0.1 seconds or more and 0.5 seconds or less), The ECU 30 may determine that motion A has been performed. This technique may be applied, for example, to the first to sixth control examples.

Further, regarding the fifth control example (see FIG. 7), the following method may be used for the above separation. That is, the ECU 30 determines the number of times the series of operations described above is performed within the predetermined time T0 within a predetermined unit time (for example, two seconds). If the number of times is one, the ECU 30 determines that the motion A corresponding to the case where the hand touches the right portion RP or the left portion LP once in the fifth control example has been performed. You may Further, when the number of times is two, the ECU 30 may determine that the motion A corresponding to the case where the number of times the hand touches the right portion RP or the left portion LP is two times in the fifth control example have been done.

Furthermore, in order to avoid unnecessary operation of the lateral direction control of this embodiment when the driver performs a hands-on operation to start manual driving, the following constraint conditions may be set for starting the lateral direction control. That is, it may be set as a constraint condition that SW2 is in the neutral state before the lateral control is started. This approach may be applied, for example, to the first, second, and fourth through seventh control examples.

What is claimed is:

1. A driving assistance device configured to control lateral movement of a vehicle, the driving assistance device comprising:

a steering operation actuator configured to turn wheels of the vehicle;

a detection device configured to detect a touching position of a hand of a driver touching a steering wheel; and an electronic control unit configured to execute lateral control on the vehicle, wherein the electronic control unit is configured to:

determine whether the hand touches a right portion of the steering wheel or a left portion of the steering wheel based on the detected touching position;

control the steering operation actuator to cause the vehicle to laterally move to right within a lane in which the vehicle is traveling, in a case where determination is made that the hand touches the right portion of the steering wheel; and control the steering operation actuator to cause the vehicle to laterally move to left within the lane in which the vehicle is traveling, in a case where determination is made that the hand touches the left portion of the steering wheel, the right portion is located on a right side with respect to a center line of the steering wheel, the center line being parallel to a vertical direction of the steering wheel, when the steering wheel is viewed alone from a front, the right portion includes an upper right portion, a middle right portion, and a lower right portion along a rotation direction of the steering wheel, the left portion is located on a left side with respect to the center line when the steering wheel is viewed alone from the front, the left portion includes an upper left portion, a middle left portion, and a lower left portion along a direction opposite to the rotation direction, the middle right portion and the middle left portion are dead zones in which the lateral control is not executed by the electronic control unit, and the electronic control unit is further configured to:

determine whether the hand touches the middle right portion or the middle left portion based on the detected touching position; and not to execute the lateral control, in a case where determination is made that the hand touches the middle right portion and the middle left portion.

2. The driving assistance device according to claim 1, wherein the right portion is a portion located on a right side with respect to a vertical plane passing through a center of the steering wheel, and the left portion is a portion located on a left side with respect to the vertical plane.

3. The driving assistance device according to claim 1, wherein the detection device is a touch sensor built into the steering wheel.

4. The driving assistance device according to claim 1, wherein the electronic control unit is further configured to:

determine whether the hand touches the upper right portion or the upper left portion based on the detected touching position;

control the steering operation actuator to cause the vehicle to laterally move to a right lane, in a case where determination is made that the hand touches the upper right portion, the right lane being a lane adjacent to and located on a right side of the lane in which the vehicle is traveling;

control the steering operation actuator to cause the vehicle to laterally move to a left lane, in a case where determination is made that the hand touches the upper left portion, the left lane being a lane adjacent to and located on a left side of the lane in which the vehicle is traveling;

determine whether the hand touches the lower right portion or the lower left portion based on the detected touching position;

control the steering operation actuator to cause the vehicle to laterally move to right within the lane in which the vehicle is traveling, in a case where determination is made that the hand touches the lower right portion; and control the steering operation actuator to cause the vehicle to laterally move to left within the lane in which the vehicle is traveling, in a case where determination is made that the hand touches the lower left portion.

5. The driving assistance device according to claim 1, wherein the electronic control unit is further configured to:

determine a total number of times the steering wheel is touched within a predetermined time period; and execute different types of lateral control based on the determined total number.

6. The driving assistance device according to claim 5, wherein the electronic control unit is further configured to:

control the steering operation actuator to cause the vehicle to laterally move to a right lane, in a case where determination is made that the hand touches the right portion twice within the predetermined time period, the right lane being a lane adjacent to and located on a right side of the lane in which the vehicle is traveling;

control the steering operation actuator to cause the vehicle to laterally move to a left lane, in a case where determination is made that the hand touches the left portion twice within the predetermined time period, the left lane being a lane adjacent to and located on a left side of the lane in which the vehicle is traveling;

control the steering operation actuator to cause the vehicle to laterally move right within a lane in which the vehicle is traveling, in a case where determination is made that the hand touches the right portion once within the predetermined time period; and control the steering operation actuator to cause the vehicle to laterally move left within the lane in which the vehicle is traveling, in a case where determination is made that the hand touches the left portion once within the predetermined time period.

* * * * *